(No Model.)

D. SIMONDS.
BAND SAW.

No. 346,565. Patented Aug. 3, 1886.

WITNESSES
P. W. Hale,
Frank W. Pickell.

INVENTOR
Daniel Simonds
by R. K. Evans
Attorney

United States Patent Office.

DANIEL SIMONDS, OF FITCHBURG, MASSACHUSETTS.

BAND-SAW.

SPECIFICATION forming part of Letters Patent No. 346,565, dated August 3, 1886.

Application filed January 16, 1886. Serial No. 188,735. (No model.)

*To all whom it may concern:*

Be it known that I, DANIEL SIMONDS, of Fitchburg, in the county of Worcester and State of Massachusetts, have invented a new and Improved Band Saw; and I hereby declare the following to be a full, clear, and exact description of the same, reference being had to the accompanying drawings, making part of this specification, in which—

Figure 1:
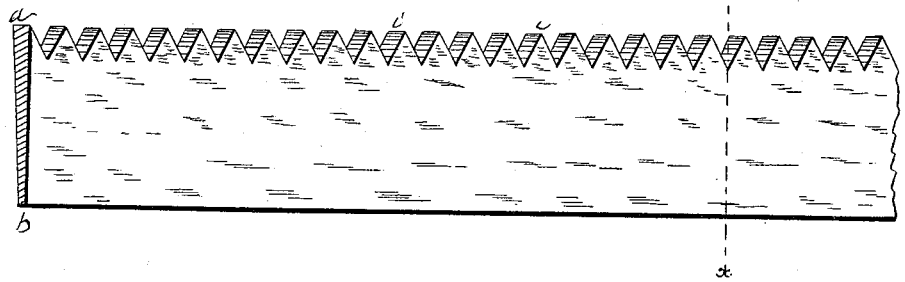
Figure 2:

Figure 1 is a perspective view of a section of one of my improved saws. Fig. 2 is a vertical cross-sectional view of the same on the line $x\ x$ of Fig. 1.

My invention relates to narrow saws—such as band-saws—and has for its object to produce a saw which can cut a curve within a minimum limit and leave a good finish on the material being cut.

In the manufacture of band-saws and saws of a similar character the teeth are punched. This operation, as is shown in practice, necessarily breaks down or forces down the metal of the saw blank or strip adjacent to the teeth, and leaves the saw, when finished, with an irregular central longitudinal plane, which interferes with a perfect cut of a saw, whether the teeth be "set" or not. The "setting" of teeth in saws of this description, in order to give a proper clearance for the blade, leaves the kerf with a rough surface, as is well understood.

The object of my invention is to provide a saw which will in use make the shortest possible turn in the material and leave a smooth surface to the kerf; and to this end my invention consists in a band or similar narrow saw having a beveled blade and milled teeth that are not set.

In order that those skilled in the art may make and use my invention, I will proceed to describe the manner in which I have carried it out.

The strip of steel or blank from which the saw is made is rolled or otherwise prepared, so that the sides of the blank will converge toward the back edge of the blade, being thereby beveled, and leaving the thickest portion of the blank at the edge where the teeth are to be formed. This is shown in the drawings at $a\ b\ d\ e$. The teeth $i$ are then cut by milling, in contradistinction to punching or pressing with a die, so as not to disturb the planes of dimension in the blank and distort the blank or blade in the slightest degree; or the blank from which the saw is made may have substantially parallel faces, and these faces be subsequently ground on a bevel, so as to taper the blade rearwardly from the teeth. After cutting the teeth by milling, and polishing the saw, it is ready for use without setting the teeth, as the beveled blade gives a clearance of at least two or three gages, and prevents the blade from binding in the kerf.

I am aware it is not broadly new to bevel the blade of a saw to give it increased clearance in the kerf, the same being shown in the patent to Geo. F. Simonds of December 26, 1882; but,

Having thus described my invention, what I claim as new, and desire to secure by Letters Patent, is—

A band-saw having unset milled teeth and a blade beveled only on converging lines from the teeth, substantially as set forth.

DANIEL SIMONDS.

Witnesses:
E. F. SIMONDS,
E. L. COLE.